US012692801B2

(12) United States Patent
Chan Chuen et al.

(10) Patent No.: US 12,692,801 B2
(45) Date of Patent: Jul. 28, 2026

(54) DE-AERATOR SEAL OF OIL SYSTEM

(71) Applicant: Pratt & Whitney Canada Corp., Longueuil (CA)

(72) Inventors: Cedric Chan Chuen, Laval (CA); Hugues Pellerin, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/987,507

(22) Filed: Dec. 19, 2024

(65) Prior Publication Data

US 2026/0176981 A1 Jun. 25, 2026

(51) Int. Cl.
*F01D 25/18* (2006.01)

(52) U.S. Cl.
CPC ...... *F01D 25/183* (2013.01); *F05D 2220/323* (2013.01); *F05D 2260/609* (2013.01); *F05D 2260/98* (2013.01)

(58) Field of Classification Search
CPC ........... F05D 2260/609; F05D 2260/98; F05D 2220/323; F01D 25/183
See application file for complete search history.

(56) References Cited

U.S. PATENT DOCUMENTS 4,755,103 A * 7/1988 Streifinger ............ F04D 29/063 384/473
6,309,198 B1 * 10/2001 Zamudio ............... F04C 29/021 418/55.6
6,398,833 B1 * 6/2002 Santerre ................. B01D 45/12 55/525
6,470,666 B1 * 10/2002 Przytulski ............... F01D 25/20 184/6.4
6,599,109 B2 * 7/2003 Zamudio ............... F04C 29/021 418/55.6
6,966,191 B2 * 11/2005 Fukutani ................... F02C 7/06 60/785

(Continued)

FOREIGN PATENT DOCUMENTS

| | | | |
|---|---|---|---|
| CA | 3000370 | A1 | 11/2018 |
| CA | 3118773 | A1 | 1/2022 |
| CA | 3118740 | A1 | 11/2022 |

OTHER PUBLICATIONS

Extended European Search Report for EP Application No. 25225959.3; Issue date, Apr. 28, 2026, 6 pages.

*Primary Examiner* — Henry Y Liu
(74) *Attorney, Agent, or Firm* — CANTOR COLBURN LLP

(57) ABSTRACT

A de-aerator includes a de-aerator housing having a fluid inlet through which a mixture of oil and air enters, an air-oil outlet through which mixture of oil and air of lower oil concentration exits, and an oil outlet through which a flow of oil exits. An impeller is positioned in the de-aerator housing and is driven about an impeller axis to separate oil from the mixture of air and oil and direct the oil toward the oil outlet, and a seal is positioned in the de-aerator housing downstream of the impeller. The seal includes a plurality of seal fins extending radially outwardly from an impeller hub of the impeller toward an inner housing surface of the de-aerator housing. The plurality of seal fins define a labyrinth seal with the inner housing surface to minimize an oil outlet oil flow from exiting the de-aerator housing via the air-oil outlet.

11 Claims, 9 Drawing Sheets

(56) References Cited

U.S. PATENT DOCUMENTS 7,377,110 B2 * 5/2008 Sheridan ................. F01D 11/04 60/39.08
8,051,952 B2 * 11/2011 Bart ........................ F01D 9/065 60/39.08
8,434,998 B2 * 5/2013 Maier ....................... F16J 15/44 415/121.2
8,657,931 B2 * 2/2014 Short ...................... F01M 13/04 55/408
8,714,132 B2 * 5/2014 Baumann .................. B04B 5/12 123/196 A
8,876,933 B2 * 11/2014 Short ...................... F01M 13/04 96/272
8,945,284 B2 * 2/2015 Short ..................... F01D 25/183 55/408
9,556,737 B2 * 1/2017 Janarthanan .............. F01D 5/08
10,913,076 B2 * 2/2021 Ishida ....................... B04B 5/12
10,953,410 B2 * 3/2021 Ishida ....................... B04B 5/08
11,674,406 B2 * 6/2023 Baker-Ostiguy ........ F01D 5/048 415/136
11,719,243 B2 * 8/2023 Baker-Ostiguy ........ F04D 9/003 415/169.1
11,933,180 B2 * 3/2024 Macfarlane .......... F16J 15/4472
2002/0047126 A1 * 4/2002 Zamudio ............... F04C 29/021 257/602
2002/0166317 A1 * 11/2002 Przytulski ............. F01D 25/125 60/39.08
2005/0132706 A1 * 6/2005 Fukutani ............... F01D 25/183 60/726
2005/0217272 A1 * 10/2005 Sheridan ............... F04D 29/063 60/39.08
2010/0180854 A1 * 7/2010 Baumann ................ B04B 5/005 123/196 R
2013/0319240 A1 * 12/2013 Short .................... F01D 25/183 95/268
2018/0029045 A1 * 2/2018 Ishida ....................... B04B 5/08
2018/0029046 A1 * 2/2018 Ishida .................... F01M 13/04
2018/0117510 A1 * 5/2018 Shanov ..................... B04C 5/04
2023/0044147 A1 * 2/2023 Baker-Ostiguy ...... F04D 29/083
2023/0193774 A1 * 6/2023 Macfarlane ............. F01D 11/02 415/173.1
2023/0415170 A1 * 12/2023 Pregenzer ................. B04B 7/02
2024/0091791 A1 * 3/2024 Örtegren ................... B04B 5/12
2024/0175376 A1 5/2024 Radon et al.
2024/0317406 A1 * 9/2024 Murray ................... F04D 25/02

* cited by examiner

DE-AERATOR SEAL OF OIL SYSTEM

BACKGROUND

Exemplary embodiments pertain to the art of oil systems of aircraft engines, and in particular to sealing of a de-aerator of the oil system.

Oil is circulated in aircraft engines to lubricate components such as bearings and other portions of the aircraft engine. The oil is supplied and replenished by an oil supply system, which among other components, includes a de-aerator. The de-aerator includes an impeller that performs separation of oil, via centrifugal force, from an air-oil mixture that is input into the de-aerator. The de-aerator includes a seal downstream of the separation chamber that prevents oil migration to a vent outlet of the de-aerator. The seal is typically a lip seal mounted on the static impeller housing and extending toward the rotating impeller to contact the impeller.

In some configurations, due in part to geometric constraints, utilizing the lip seal results in back pressure losses in the de-aerator.

BRIEF DESCRIPTION

In one exemplary embodiment, a de-aerator for an oil system of an aircraft engine includes a de-aerator housing having a fluid inlet through which a mixture of oil and air enters the de-aerator housing, an air-oil outlet through which mixture of oil and air of lower oil concentration than the inlet mixture exits the de-aerator housing, and an oil outlet through which a flow of oil exits the de-aerator housing. An impeller is positioned in the de-aerator housing and is driven about an impeller axis to separate oil from the mixture of air and oil and direct the oil toward the oil outlet, and a seal is positioned in the de-aerator housing downstream of the impeller. The seal includes a plurality of seal fins extending radially outwardly from an impeller hub of the impeller toward an inner housing surface of the de-aerator housing. The plurality of seal fins define a labyrinth seal with the inner housing surface to minimize an oil outlet oil flow from exiting the de-aerator housing via the air-oil outlet.

Additionally or alternatively, in this or other embodiments the plurality of seal fins are formed as one-piece, monolithic structure with the impeller.

Additionally or alternatively, in this or other embodiments a finned sleeve includes a sleeve body, and the plurality of seal fins extending radially outwardly from the sleeve body. The finned sleeve is installed to the impeller hub.

Additionally or alternatively, in this or other embodiments the finned sleeve is installed to an outer hub surface of the impeller hub.

Additionally or alternatively, in this or other embodiments a retaining ring is configured to axially retain the finned sleeve to the impeller hub.

Additionally or alternatively, in this or other embodiments the finned sleeve extends at least partially inside of the impeller hub.

Additionally or alternatively, in this or other embodiments the finned sleeve is axially retained to the impeller hub via a retaining shaft extending through the seal sleeve and a nut installed onto the retaining shaft.

Additionally or alternatively, in this or other embodiments one or more clocking features circumferentially locate and retain the finned sleeve relative to the impeller hub.

In another exemplary embodiment, an oil supply system for supplying oil to a lubricating cavity of a gas turbine engine includes one or more pumps configured to urge oil toward the lubricating cavity, and a de-aerator hydraulically connected to the lubricating cavity via a scavenge line. The de-aerator includes a de-aerator housing having a fluid inlet through which a mixture of oil and air enters the de-aerator housing from the scavenge line, an air-oil outlet through which mixture of oil and air of lower oil concentration than the inlet mixture exits the de-aerator housing, and an oil outlet through which a flow of oil exits the de-aerator housing. An impeller is positioned in the de-aerator housing and is driven about an impeller axis to separate oil from the mixture of air and oil and direct the oil toward the oil outlet. A seal is positioned in the de-aerator housing downstream of the impeller. The seal includes a plurality of seal fins extending radially outwardly from an impeller hub of the impeller toward an inner housing surface of the de-aerator housing. The plurality of seal fins define a labyrinth seal with the inner housing surface to minimize an oil outlet oil flow from exiting the de-aerator housing via the air-oil outlet.

Additionally or alternatively, in this or other embodiments the plurality of seal fins are formed as one-piece, monolithic structure with the impeller.

Additionally or alternatively, in this or other embodiments a finned sleeve includes a sleeve body, and the plurality of seal fins extending radially outwardly from the sleeve body. The finned sleeve is installed to the impeller hub.

Additionally or alternatively, in this or other embodiments the finned sleeve is installed to an outer hub surface of the impeller hub.

Additionally or alternatively, in this or other embodiments a retaining ring is configured to axially retain the finned sleeve to the impeller hub.

Additionally or alternatively, in this or other embodiments the finned sleeve extends at least partially inside of the impeller hub.

Additionally or alternatively, in this or other embodiments the finned sleeve is axially retained to the impeller hub via a retaining shaft extending through the seal sleeve and a nut installed onto the retaining shaft.

Additionally or alternatively, in this or other embodiments one or more clocking features circumferentially locate and retain the finned sleeve relative to the impeller hub.

In yet another exemplary embodiment, a gas turbine engine system includes a gas turbine engine, and an oil supply system configured to supply oil to a lubricating cavity of the gas turbine engine. The oil supply system includes a de-aerator including a de-aerator housing having a fluid inlet through which a mixture of oil and air enters the de-aerator housing from the scavenge line, an air-oil outlet through which mixture of oil and air of lower oil concentration than the inlet mixture exits the de-aerator housing, and an oil outlet through which a flow of oil exits the de-aerator housing. An impeller is positioned in the de-aerator housing and is driven about an impeller axis to separate oil from the mixture of air and oil and direct the oil toward the oil outlet. A seal is positioned in the de-aerator housing downstream of the impeller. The seal includes a plurality of seal fins extending radially outwardly from an impeller hub of the impeller toward an inner housing surface of the de-aerator housing. The plurality of seal fins define a labyrinth seal with the inner housing surface to minimize an oil outlet oil flow from exiting the de-aerator housing via the air-oil outlet.

Additionally or alternatively, in this or other embodiments the plurality of seal fins are formed as one-piece, monolithic structure with the impeller.

Additionally or alternatively, in this or other embodiments a finned sleeve includes a sleeve body, and the plurality of seal fins extending radially outwardly from the sleeve body. The finned sleeve is installed to the impeller hub.

Additionally or alternatively, in this or other embodiments one or more clocking features circumferentially locate and retain the finned sleeve relative to the impeller hub.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
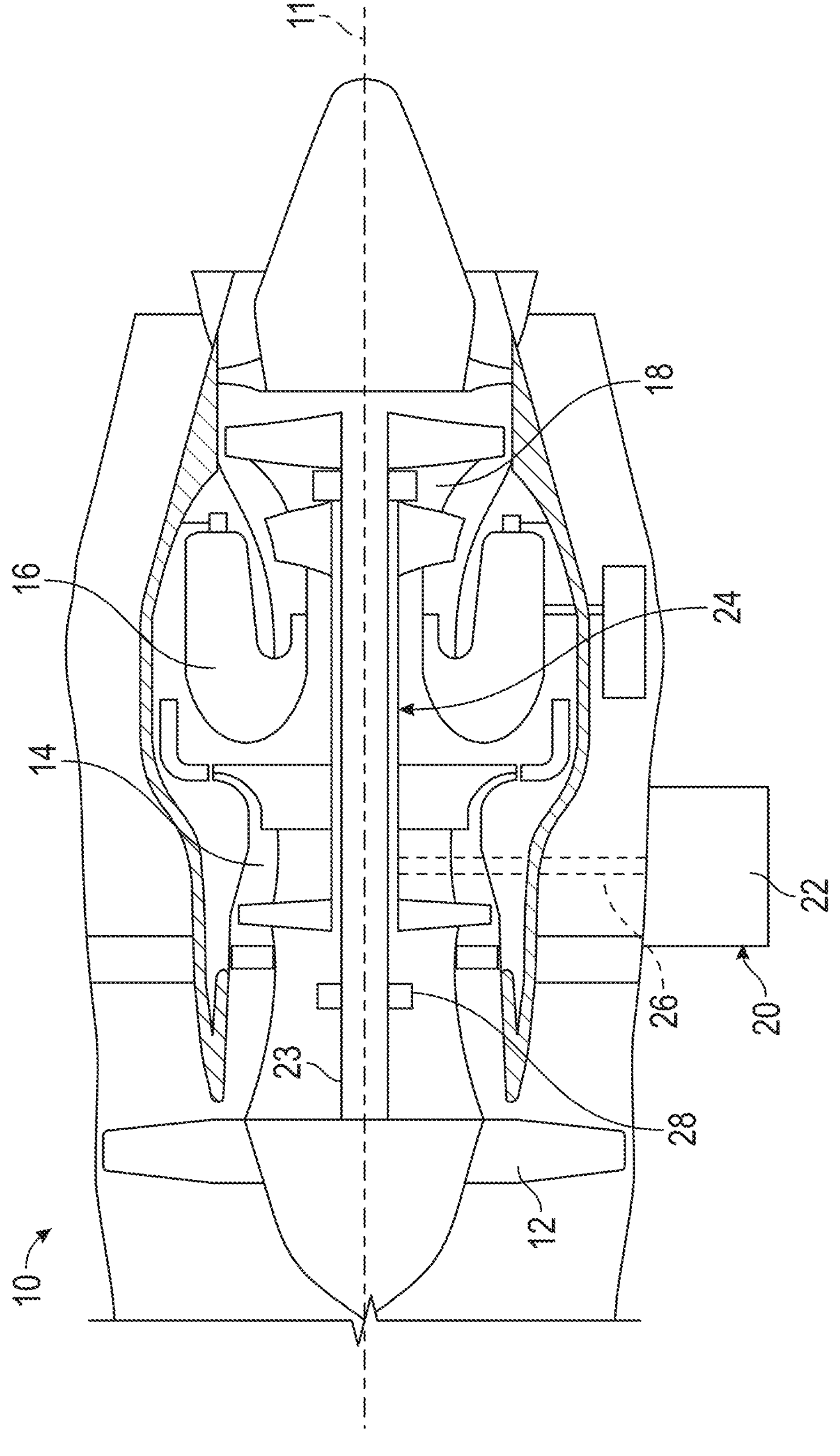
FIG. 1 is a schematic cross-sectional view of an embodiment of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the engine 10.

The fan 12 is drivingly interconnected to low pressure rotor(s) of the turbine section 18 through a low pressure shaft 23, and the high pressure rotor(s) of the compressor section 14 is/are drivingly connected to high pressure rotor (s) of the turbine section 18 through a high pressure shaft 24 concentrically surrounding the low pressure shaft 23.

The gas turbine engine 10 may include an accessory drive assembly 20 which includes an accessory gearbox (AGB) 22. Although not shown, the accessory drive assembly 20 can also include a pump assembly and/or a starter generator. The accessory drive assembly 20 may be driven by the high pressure shaft 24 via an accessory shaft 26 which drivingly interconnects the high pressure shaft 24 and the accessory gearbox 22. Bearings 28 may be used to rotatably support different components of the engine 10, such as the high- or low-pressure shafts 24,23 and components of the AGB 22. Those bearings 28 may be located within bearing cavities, which may be connected to a source of lubricant for cooling and lubricating the bearings. In some cases, the bearing cavities are connected to a source of compressed air, such as a stage of the compressor section 16, for maintaining a pressure outside the bearing cavities greater than that inside them to limit leakage of lubricant. In the description below, the terms “lubricant” and “oil” are used interchangeably.

Figure 2:
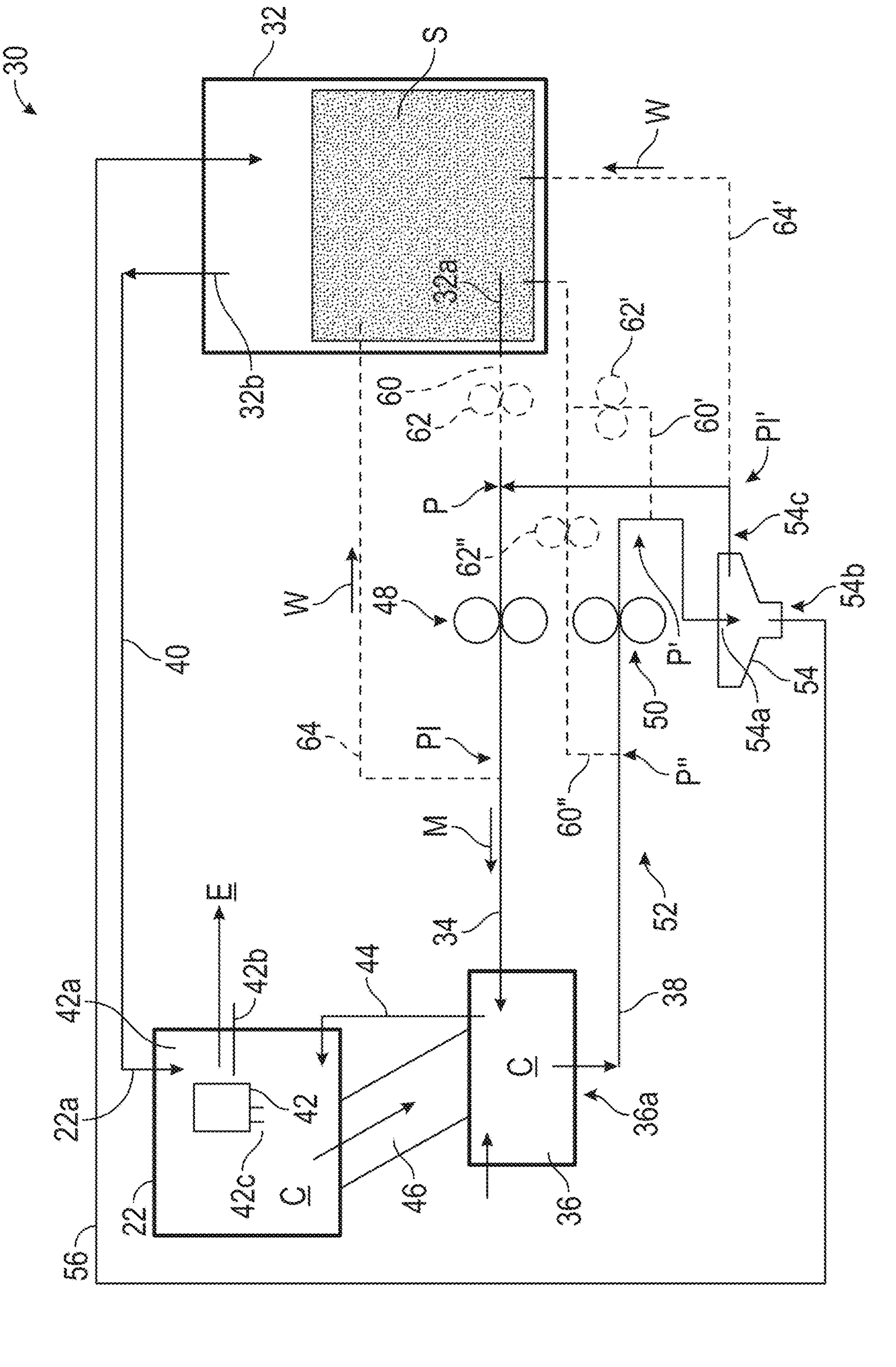
FIG. 2 is a schematic illustration of an exemplary oil supply system of a gas turbine engine.

Referring now to FIG. 2, an exemplary oil supply system is shown generally at 30. It is to be appreciated that the oil supply system 30 of FIG. 2 is merely exemplary, and that the present disclosure may be similarly applied to other oil supply system configurations. The system 30 includes a source of oil S, which in this case is an oil tank 32. The system 30 further includes a main line 34 hydraulically connected to an outlet 32*a* of the oil tank 32 and to at least one lubricating cavity C, which may include the AGB 22 and one or more bearing cavities 36 containing some of the bearings 28 (FIG. 1). The system 30 further includes a scavenge line 38 hydraulically connected to a scavenge outlet 36*a* of the bearing cavity(ies) 36 and to the oil tank 32 for returning scavenged oil back to the oil tank.

A vent line 40 hydraulically connects an air outlet 32*b* of the oil tank 32 to an air inlet 22*a* of the AGB 22. A de-oiler 42 may be located within the cavity C of the AGB 22. The de-oiler 42 may have an air-oil inlet 42*a* for receiving an air-oil mixture and an air outlet 42*b* for expelling air. The air-oil mixture received within the de-oiler 42 via its inlet 42*a* may be composed mainly of air. The oil contained within this mixture may in part provide from the oil contained within the cavity C that is jetted therein and that splashes upon impact with rotating gear(s) of the AGB 22. The de-oiler 42 may have an oil outlet 42*c* for outputting oil extracted from the air-oil mixture. The de-oiler 42 may remove a remainder of oil contained within the air-oil mixture flowing within the vent line 40 and may expel the air to an environment E outside the system 30. The extracted oil may exit the de-oiler 42 via the oil outlet 42*c* and may be used for lubrication. The oil exits the de-oiler 42 via the oil outlet 42 *c* and may lubricate components of the AGB 22 and/or the bearings 28 contained in the bearing cavities 36. The substantially de-oiled air may exit the de-oiler 42 via its air outlet 42*b* and be expelled to the environment E. The de-oiler 42 may include a porous medium (e.g., sponge) through which an air-oil mixture is injected for agglomerating oil droplets into bigger droplets.

In the embodiment shown, the oil is injected first into the bearing cavity 36 and directed to the AGB 22 via a line 44. Once the oil has lubricated the components of the AGB 22, the oil may circulate by gravity or other means toward the bearing cavity 36 via one or more conduits 46. Other configurations are contemplated without departing from the scope of the present disclosure. For instance, the oil may lubricate the bearings 28 (FIG. 1) in the bearing cavities 36 before being directed to the AGB 22 for lubrication thereof.

In the embodiment shown, a main pump 48 and a scavenge pump 50 are used to drive a flow of oil in the main line 34 and scavenge line 38, respectively. In other words, the main pump 48 is hydraulically connected on the main line 34 and the scavenge pump 50 is hydraulically connected on the scavenge line 38. The main pump 48 has a main pump inlet hydraulically connected to the outlet 54*c* of the de-aerator 54 and a main pump outlet hydraulically connected to the lubricating cavities C. The scavenge pump 50 has a scavenge pump inlet hydraulically connected to the scavenge outlet 36*a* of the cavities C and a scavenge pump outlet hydraulically connected to the de-aerator 54 via inlet 54*a* thereof. Other configurations are contemplated without departing from the scope of the present disclosure. For instance, the oil may be scavenged with separate scavenge pumps and/or by blow down.

The oil system 30 further includes a closed-loop oil circuit 52 in which oil may circulate in loop to and from the cavities C. The system 30 also includes a de-aerator 54 for separating the air from the scavenged oil.

The de-aerator 54 has an air-oil inlet 54*a*, air-oil outlet 54*b* and an oil outlet 54*c*. The air-oil inlet 54*a* is hydraulically connected to the scavenge outlet 36*a* of the cavity C via the scavenge line 38; the air-oil outlet 54*b* is hydraulically connected to the oil tank 32 via a return line 56; and the oil outlet 54*c* is hydraulically connected to the cavities C via the main line 34. As shown, the return line 56 is hydraulically connected to the de-oiler 42 via the vent line 40. The de-aerator 54 is used to remove the air from a first air-oil mixture it receives via the air-oil inlet 54*a*. In some cases, however, the de-aerator is unable to extract an entirety of the oil from the received first air-oil mixture. In such a case, a second air-oil mixture is outputted from the de-aerator 54 via the air-oil outlet 54*b* and is directed toward the tank 32 where air and oil of the second air-oil mixture may separate. It will be appreciated that an oil concentration of the first air-oil mixture may be greater than that of the second air-oil mixture. The disclosed de-aerator 54 has solely two outlets: the oil outlet 54*c* and the air-oil outlet 54*b*. The de-aerator 54 may have solely three connections to the oil system 30, that is the air-oil inlet 54*a*, the air-oil outlet 54*b*, and the oil outlet 54*c*, and may be free of other connections to the oil system.

The de-aerator may be an "active" de-aerator, such as a centrifugal deaerator which has at least one component (such as a rotor, for example), which is driven, such as by electrical and/or pneumatic and/or hydraulic or other means (motors, actuators, etc.). Herein, an active de-aerator may be an assembly including a rotor, and defining an inlet, an oil outlet, and an air outlet; the inlet, the oil outlet, and the air outlet being static relative to the rotor. An active de-aerator may rely on centrifugal force for separating the oil from the air. The de-aerator 54 may differ from the de-oiler 42 as it may not include a porous medium. A cross-section of the rotor may ensure that a positive pressure differential is maintained between the air outlet and the oil outlet; the oil outlet being at a higher pressure than the air outlet.

The de-oiler 42 is designed to remove a small quantity of oil (e.g., oil droplets/mist) remaining in an air flow injected therein via the vent line 40. This is different than the de-aerator 54 that is designed to remove a small quantity of air from an oil mixture. In other words, the de-oiler 42 may remove a small quantity of oil remaining within a mixture composed mainly of air before expelling said air to the environment E. The de-aerator 54 may remove a small quantity of air remaining within a mixture composed mainly of oil before distributing said oil to the lubricating cavities.

In some cases, the oil circulating within the closed-loop oil circuit 52 may be consumed (e.g., burned, leaked, and so on) such that more oil may need to be added to the closed-loop oil circuit 52. In the embodiment show, the system 30 further includes a make-up line 60; a plurality of available positions of the make-up line 60 are shown in dashed lines in FIG. 2 and are referred to herein below as 60, 60', 60". Those positions are described herein below. In each cases, the make-up lines 60, 60', 60" may have an inlet hydraulically connected to the oil tank 32 for receiving a make-up flow of oil.

In a first possibility, the make-up line 60 is hydraulically connected to the main line 34 at a connection point P located between the de-aerator 54 and the main pump 48. Stated differently, the make-up line 60 may be connected downstream of the de-aerator 54 and upstream of the main pump 48 relative to a main flow of oil circulating within the main line 34 and denoted by arrow M. In a second possibility, the make-up line 60' is hydraulically connected to the scavenge line 38 at a connection point P' located between the scavenge pump 50 and the de-aerator 54. Stated differently, the make-up line 60' may be connected upstream of the de-aerator 54 and downstream of the scavenge pump 50 relative to a scavenge flow of oil. In a third possibility, the make-up line 60" is hydraulically connected to the scavenge line 38 at a connection point P" located between the scavenge outlet 36*a* of the cavity 36 and the scavenge pump 50. Stated differently, the make-up line 60" may be connected upstream of the scavenge pump 50 and downstream of the scavenge outlet 36*a* relative to the scavenge flow. It is understood that other possibilities are contemplated without departing from the scope of the present disclosure.

For each of the above described possible connections of the make-up line 60, 60', 60", a make-up pump 62, 62', 62" may be hydraulically connected on the make-up line 60, 60', 60" to induce a flow from the oil tank 32 towards the connection points P, P', P" described above. The make-up pump may be avoided in some configurations.

In some cases, a flow of oil returning back to the tank 32 via the air-oil outlet 54*b* of the de-aerator 54 and the return line 56 hydraulically connected thereto may be insufficient to maintain a minimum temperature within the tank 32. In these cases, a warm-up flow, denoted by arrow W, may be drawn from the closed-loop oil circuit 52 and directed toward the tank 32. The warm-up flow W may be drawn from a plurality of locations from the closed-loop oil circuit 52. FIG. 2 illustrates two possibilities. However, it is understood that the warm-up flow may be drawn from any of the main line 34, scavenge line 38, de-aerator oil line, and so on.

For drawing the warm-up flow W, a warm-up line 64 may be hydraulically connected to the main line 34 at a connection point PI located downstream of the main pump 48 relative to the main flow M and upstream of the cavities C. Alternatively, the connection point PI may be located upstream of the main pump 48 and downstream of the connection point P between the make-up line 60 and the closed-loop oil circuit 52. Alternatively, the warm-up line 64' may be hydraulically connected to the main line 34 downstream of the de-aerator 54 and upstream of the main pump 48 relative to the main flow M. More specifically, a connection point PI' between the make-up line 64' and the main line 34 may be located upstream of the connection point P between the make-up line 60 and the closed-loop oil circuit 52. Any other suitable location for the connection point PI between the warm-up line 64 and the closed-loop oil circuit 52 are contemplated without departing from the scope of the present disclosure.

Figure 3:
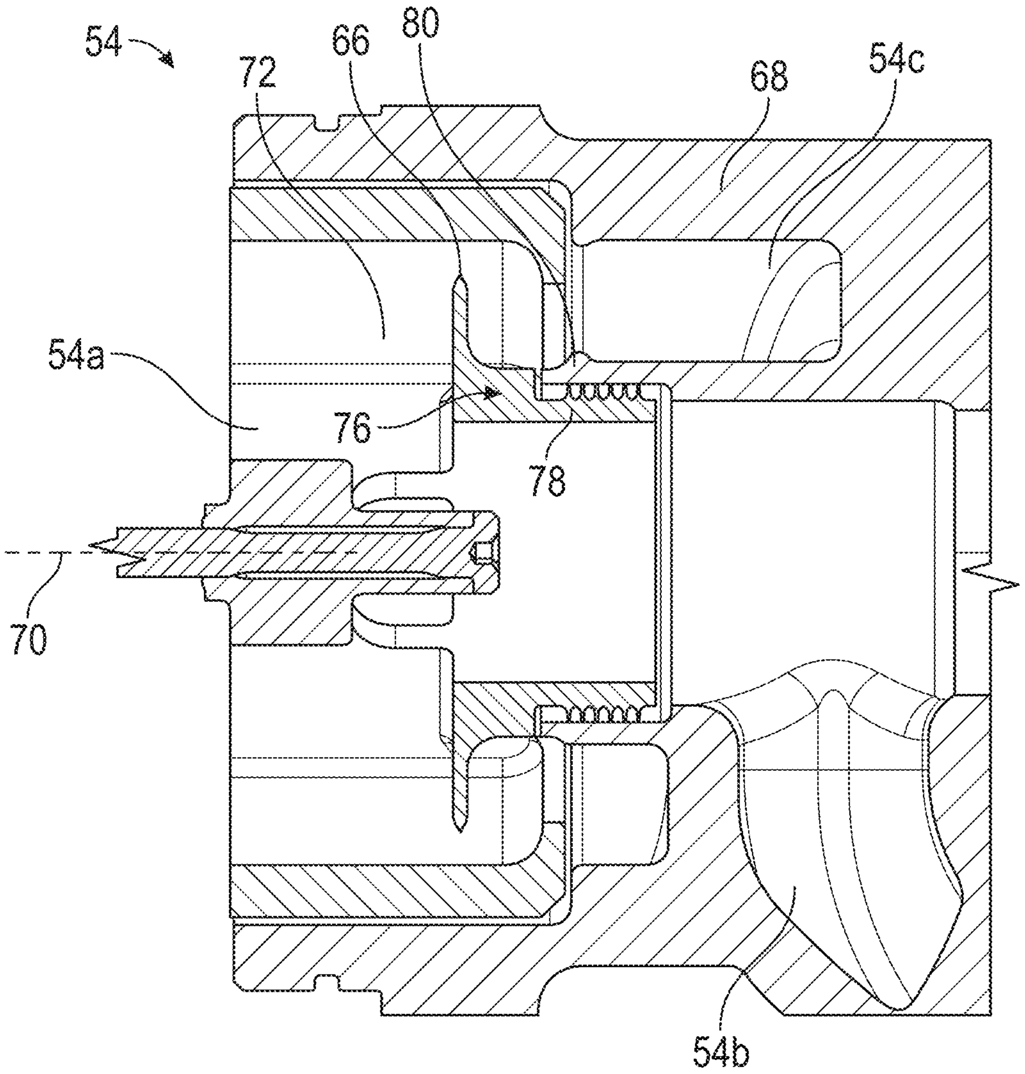
FIG. 3 is a partial cross-sectional view of an embodiment of a de-aerator.

Referring now to FIG. 3, the de-aerator 54 includes an impeller 66 disposed in a de-aerator housing 68 and rotatable about an impeller axis 70. The impeller 66 is in flow communication with the air-oil inlet 54*a*. The impeller 66 separates oil from the flow of air and oil entering the de-aerator housing 68 via the air-oil inlet 54 via centrifugal force of the rotation of the impeller 66 about the impeller axis 70. This separation occurs at a separation chamber 72 of the de-aerator impeller 66.

Figure 4:
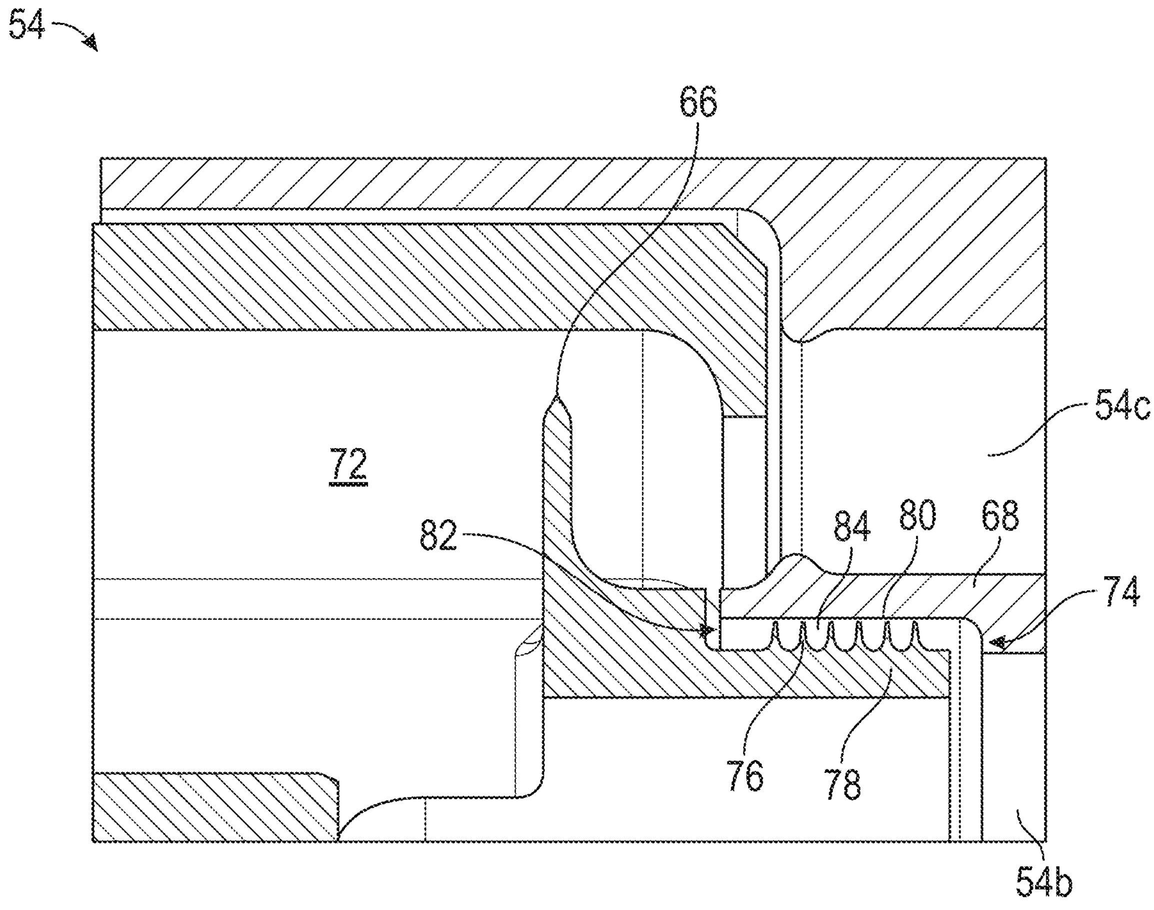
FIG. 4 is a partial cross-sectional view of an embodiment of a seal arrangement of a de-aerator.

Because of the pressure differential between the air-oil outlet 54*b* and the oil outlet 54*c*, a seal 74 is positioned downstream of the separation chamber 72 to prevent separated oil from proceeding into the air-oil outlet 54*b* instead of proceeding through the oil outlet 54*c*. The seal 74 is located on an opposite axial side of the impeller 66 from the separation chamber 72. The seal 74 includes a plurality of seal fins 76 extending radially outwardly from an impeller hub 78 of the impeller 66. The plurality of seal fins 76 extend toward a housing inner surface 80 of the de-aerator housing 68 and define a tortuous or, labyrinth pathway 82 between the plurality of seal fins 76 and the housing inner surface 80. As illustrated in FIG. 4, in some embodiments, fin tips 84 of the plurality of seal fins 76 do not contact the housing inner surface 80. This labyrinth pathway 82 restricts the oil from flowing from the oil outlet 54*c* into the air-oil outlet 54*b*, and maximizes the oil flow through the oil outlet 54*c*. In some embodiments, such as illustrated in FIG. 4, the plurality of seal fins 76 are formed integral to the impeller hub 78, as unitary elements of the impeller 66. In some embodiments, as illustrated in FIG. 4, the plurality of seal fins 76 extend perpendicularly from the impeller hub 78, while in other embodiments the plurality of seal fins 78 extend non-perpendicularly from the impeller hub 78.

Figure 5:
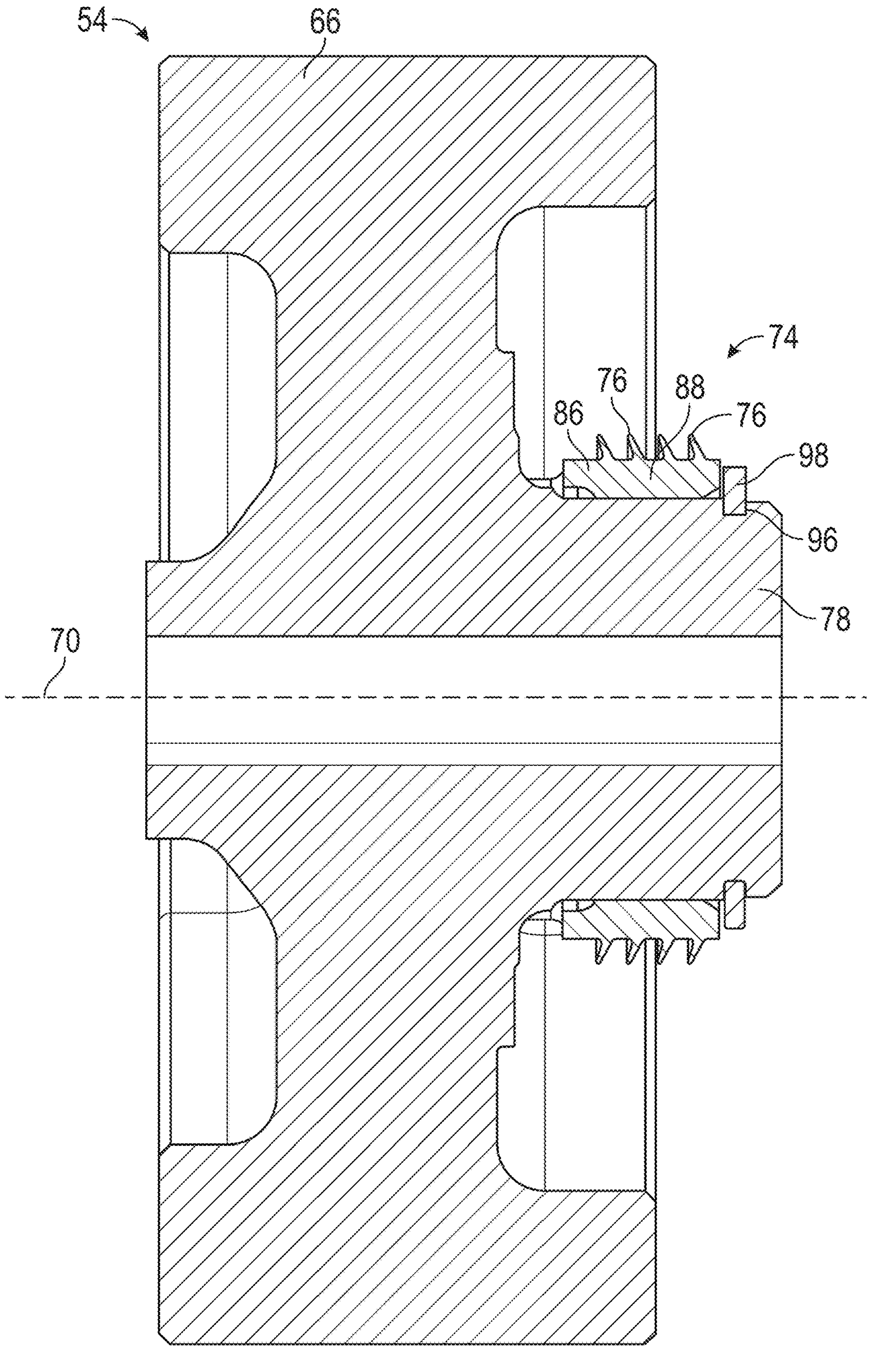
FIG. 5 is a partial cross-sectional view of another embodiment of a seal arrangement of a de-aerator.
Figure 6:
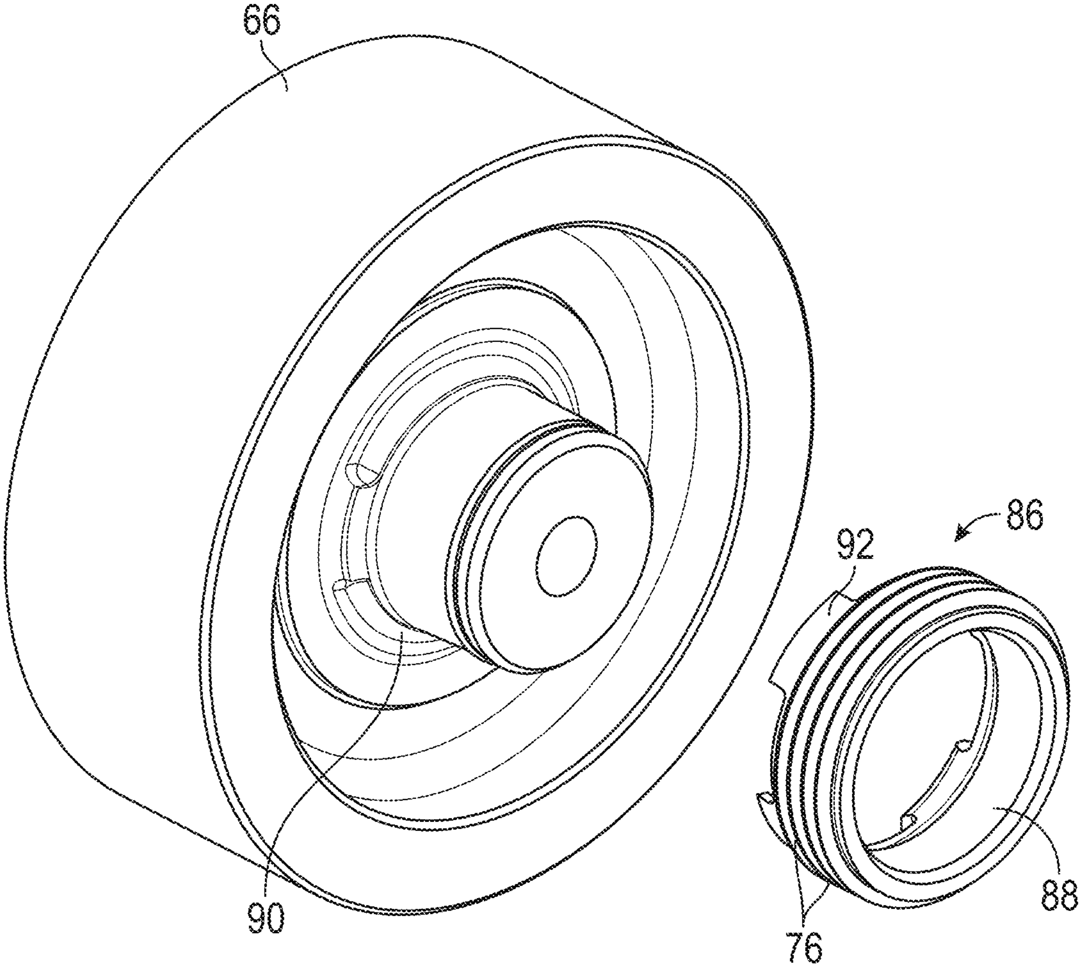
FIG. 6 is a partially disassembled view of the seal arrangement of FIG. 5.
Figure 7:
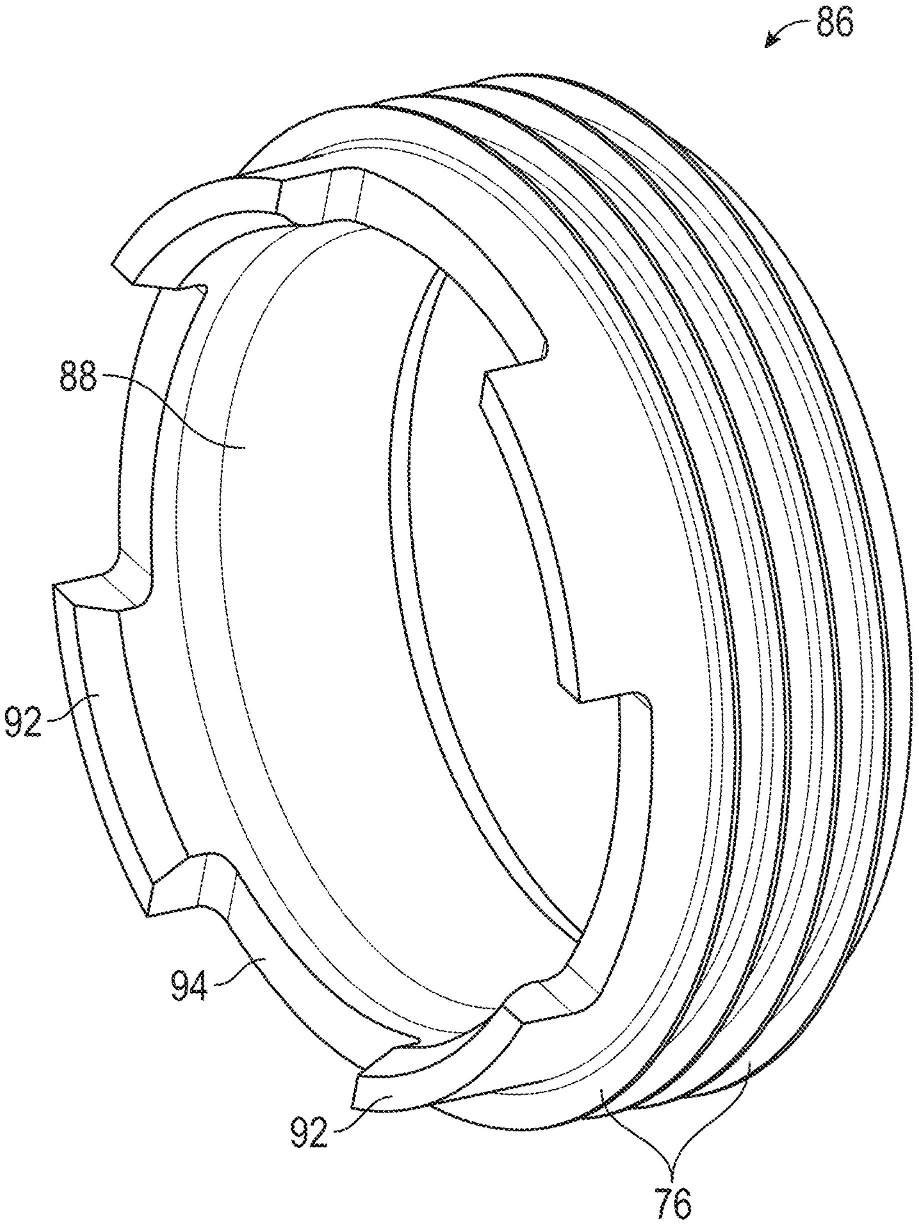
FIG. 7 is a perspective view of an embodiment of a finned sleeve of a de-aerator.

Referring now to FIGS. 5 and 6, in some embodiments the plurality of seal fins 76 are disposed on a finned sleeve 86 that is installed to the impeller hub 78, either via a tight fit, such as an interference fit or press fit, or a relatively loose fit. The finned sleeve 86 includes a sleeve body 88 that is defined as a ring extending around the impeller hub 78, with the plurality of seal fins 76 extending radially outwardly from the sleeve body 88. As illustrated in FIG. 6, the arrangement includes clocking features to circumferentially locate and retain the finned sleeve 86 relative to the impeller hub 78. For example, in one embodiment the impeller hub 78 includes retaining slots 90 into which retaining tabs 92 of the finned sleeve 86 are installed when the finned sleeve 86 is assembled to the impeller hub 78. In some embodiments, such as shown in FIG. 7, the retaining tabs 92 extend axially from a body end 94 of the sleeve body 88 to be installed into the retaining slots 90. The retaining tab 92/retaining slot 90 arrangement circumferentially retains the finned sleeve 86 relative to the impeller hub 78. Referring again to FIG. 5, the impeller hub 78 includes a hub slot 96 into which a retaining ring 98 is installed to thereby axially retain the finned sleeve 86 to the impeller hub 78.

Figure 8:
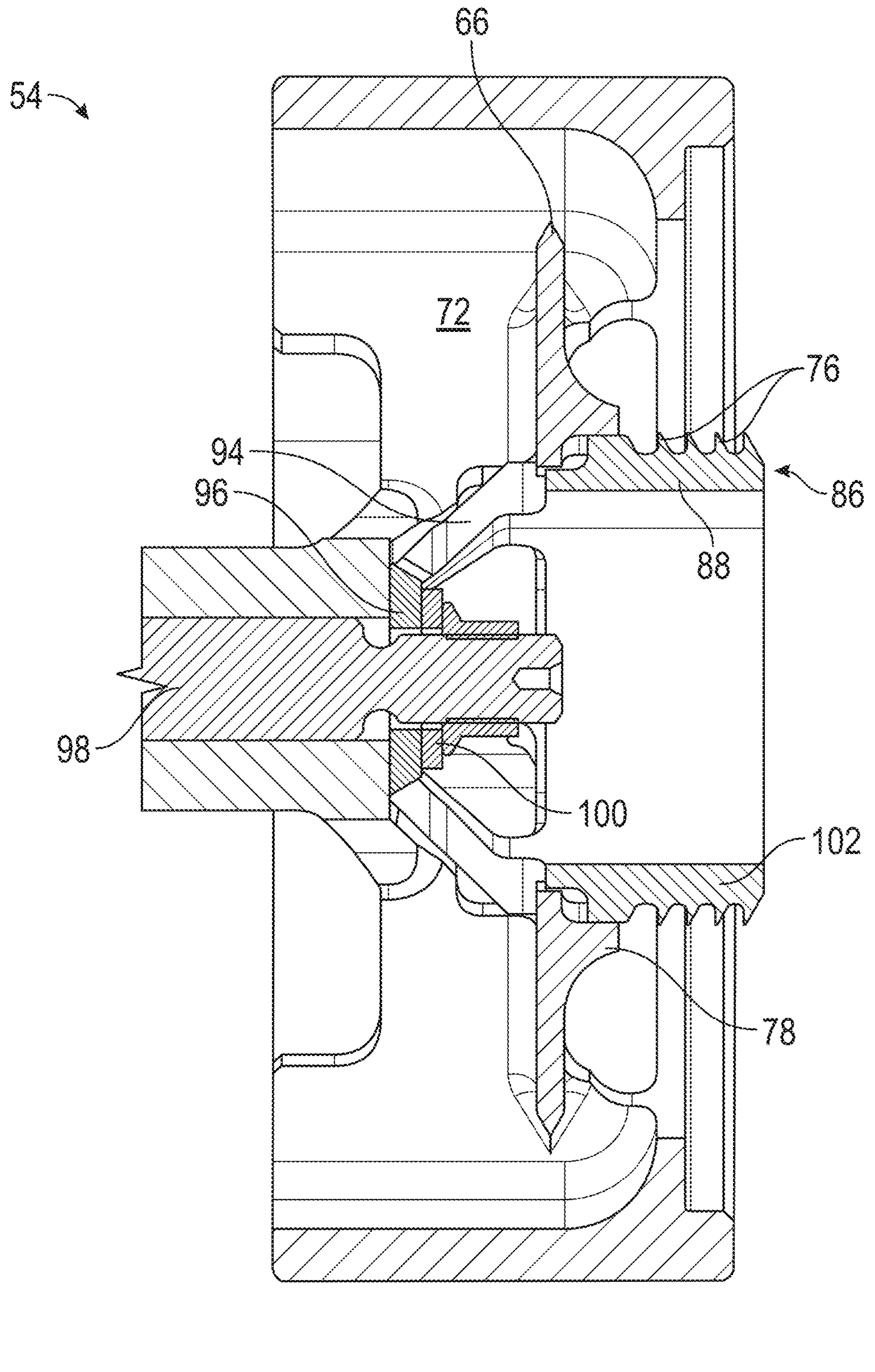
FIG. 8 is a partial cross-sectional view of yet another embodiment of a seal arrangement of a de-aerator.

Referring now to FIG. 8, in another embodiment the finned sleeve 86 is installed to the impeller hub 78 such that the sleeve body 88 at least partially is positioned radially inboard of the impeller hub 78. The body end 94, located radially inboard of the impeller hub 78, may have, for example, a conical or a truncated conical shape such as shown in FIG. 8. The body end 94 further includes a through opening 96 that fits onto a retaining shaft 98, which is coaxial with the impeller 66. The finned sleeve 86 is axially retained on the retaining shaft 98 via, for example, a retaining nut 100 installed onto the retaining shaft 98. Additionally, in some embodiments the impeller hub 78 includes a locating surface 102 utilized during installation of the body end 94 into the impeller hub 78 and to locate the sleeve body 88 at the retaining shaft 98.

Figure 9:
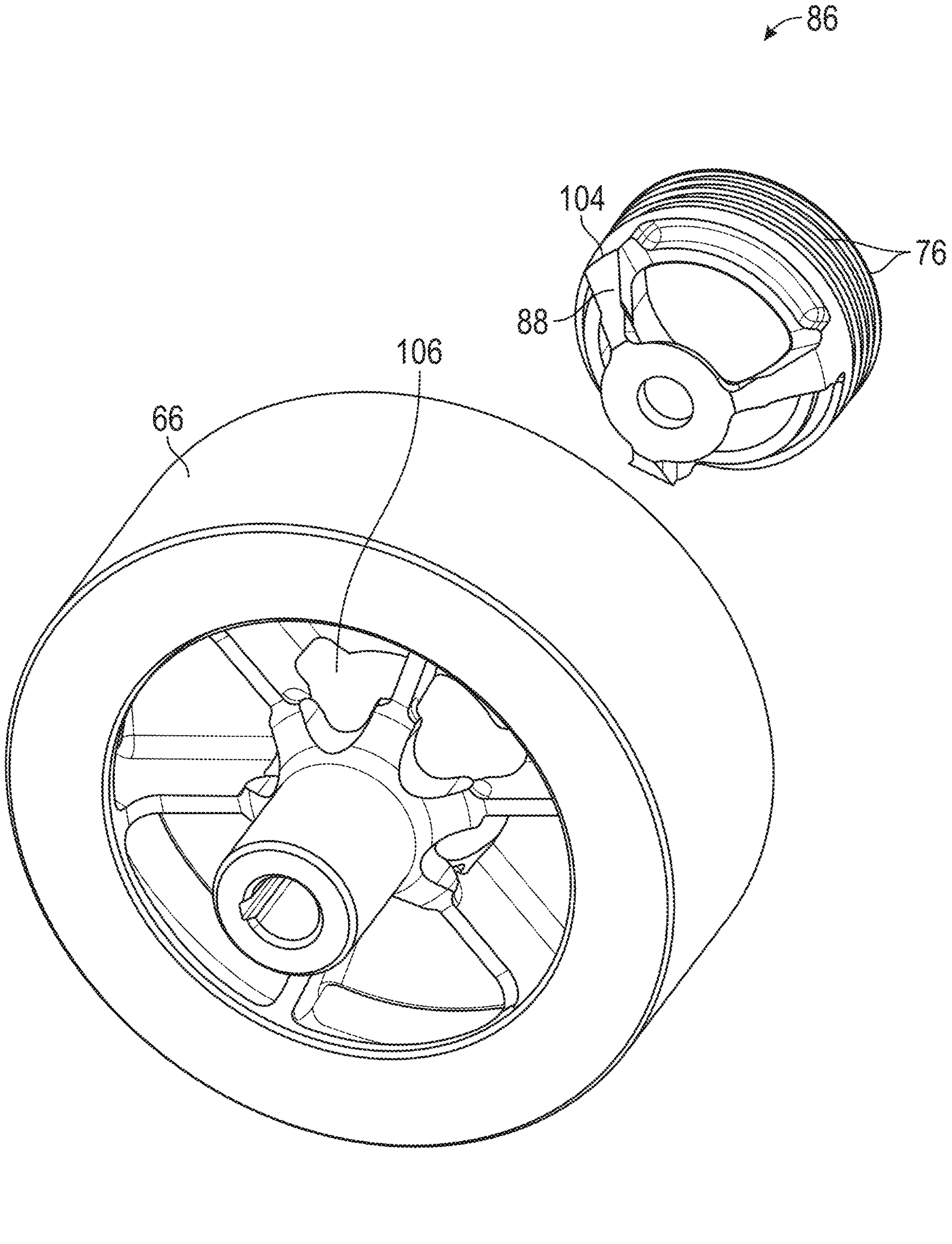
FIG. 9 is a partially disassembled view of the seal arrangement of FIG. 8.

The sleeve body 88 may include locating features to circumferentially retain the finned sleeve 86 relative to the impeller 66. For example, as illustrated in FIG. 9, the sleeve body 88 may include retaining tabs 104 that are installed into the impeller hub 78 at corresponding retaining notches 106 formed in the impeller hub 78. This installation circumferentially retains the finned sleeve 86 relative to the impeller 66, preventing relative rotation thereof.

Use of the seal 74 which is installed onto the impeller 66 or is formed integral to the impeller 66 moves the seal element from the housing, as was the case in prior de-aerators. This moves the seal further radially inboard, allowing for a reduction in overall size of the de-aerator. Further, the seal 74 allows for a radial growth of the air-oil outlet 54*b* without an impact to the oil outlet 54*c*.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A de-aerator for an oil system of an aircraft engine, comprising:
- a de-aerator housing, including:
  - a fluid inlet through which a mixture of oil and air enters the de-aerator housing;
  - an air-oil outlet through which mixture of oil and air of lower oil concentration than the inlet mixture exits the de-aerator housing; and
  - an oil outlet through which a flow of oil exits the de-aerator housing;
  - an impeller disposed in the de-aerator housing and driven about an impeller axis to separate oil from the mixture of air and oil and direct the oil toward the oil outlet; and
  - a seal disposed in the de-aerator housing downstream of the impeller, the seal including:
    - a plurality of seal fins extending radially outwardly from an impeller hub of the impeller toward an inner housing surface of the de-aerator housing;
    - wherein the plurality of seal fins define a labyrinth seal with the inner housing surface to minimize an oil outlet oil flow from exiting the de-aerator housing via the air-oil outlet;
  - further comprising a finned sleeve including:
    - a sleeve body; and
    - the plurality of seal fins extending radially outwardly from the sleeve body;
    - wherein the finned sleeve is installed to an outer hub surface of the impeller hub.

2. The de-aerator of claim 1, further comprising a retaining ring configured to axially retain the finned sleeve to the impeller hub.

3. The de-aerator of claim 1, wherein the finned sleeve extends at least partially inside of the impeller hub.

4. The de-aerator of claim 3, wherein the finned sleeve is axially retained to the impeller hub via a retaining shaft extending through the seal sleeve and a nut installed onto the retaining shaft.

5. The de-aerator of claim 1, further comprising one or more clocking features to circumferentially locate and retain the finned sleeve relative to the impeller hub.

6. An oil supply system for supplying oil to a lubricating cavity of a gas turbine engine, comprising:
one or more pumps configured to urge oil toward the lubricating cavity; and
a de-aerator hydraulically connected to the lubricating cavity via a scavenge line, the de-aerator including:
a de-aerator housing, including:
a fluid inlet through which a mixture of oil and air enters the de-aerator housing from the scavenge line;
an air-oil outlet through which mixture of oil and air of lower oil concentration than the inlet mixture exits the de-aerator housing; and
an oil outlet through which a flow of oil exits the de-aerator housing;
an impeller disposed in the de-aerator housing and driven about an impeller axis to separate oil from the mixture of air and oil and direct the oil toward the oil outlet; and
a seal disposed in the de-aerator housing downstream of the impeller, the seal including:
a plurality of seal fins extending radially outwardly from an impeller hub of the impeller toward an inner housing surface of the de-aerator housing;
wherein the plurality of seal fins define a labyrinth seal with the inner housing surface to minimize an oil outlet oil flow from exiting the de-aerator housing via the air-oil outlet;
further comprising a finned sleeve including:
a sleeve body; and
the plurality of seal fins extending radially outwardly from the sleeve body;
wherein the finned sleeve is installed to an outer hub surface of the impeller hub.

7. The oil supply system of claim 6, further comprising a retaining ring configured to axially retain the finned sleeve to the impeller hub.

8. The oil supply system of claim 6, wherein the finned sleeve extends at least partially inside of the impeller hub.

9. The oil supply system of claim 8, wherein the finned sleeve is axially retained to the impeller hub via a retaining shaft extending through the seal sleeve and a nut installed onto the retaining shaft.

10. The oil supply system of claim 6, further comprising one or more clocking features to circumferentially locate and retain the finned sleeve relative to the impeller hub.

11. A gas turbine engine system, comprising:
a gas turbine engine; and
an oil supply system configured to supply oil to a lubricating cavity of the gas turbine engine;
wherein the oil supply system includes a de-aerator, including:
a de-aerator housing, including:
a fluid inlet through which a mixture of oil and air enters the de-aerator housing from the scavenge line;
an air-oil outlet through which mixture of oil and air of lower oil concentration than the inlet mixture exits the de-aerator housing; and
an oil outlet through which a flow of oil exits the de-aerator housing;
an impeller disposed in the de-aerator housing and driven about an impeller axis to separate oil from the mixture of air and oil and direct the oil toward the oil outlet; and
a seal disposed in the de-aerator housing downstream of the impeller, the seal including:
a plurality of seal fins extending radially outwardly from an impeller hub of the impeller toward an inner housing surface of the de-aerator housing;
wherein the plurality of seal fins define a labyrinth seal with the inner housing surface to minimize an oil outlet oil flow from exiting the de-aerator housing via the air-oil outlet;
further comprising a finned sleeve including:
a sleeve body; and
the plurality of seal fins extending radially outwardly from the sleeve body;
wherein the finned sleeve is installed to the impeller hub; and
further comprising one or more clocking features to circumferentially locate and retain the finned sleeve relative to the impeller hub.

* * * * *